(12) United States Patent
Lacaze et al.

(10) Patent No.: US 9,649,813 B2
(45) Date of Patent: May 16, 2017

(54) METHOD FOR ENABLING THE PARTIAL PRINTING OF A DEVICE

(71) Applicants: Alberto Daniel Lacaze, Potomac, MD (US); Karl Nicholas Murphy, Rockville, MD (US)

(72) Inventors: Alberto Daniel Lacaze, Potomac, MD (US); Karl Nicholas Murphy, Rockville, MD (US)

(73) Assignee: Robotic Research, LLC, Gaithersburg, MD (US)

(*) Notice: Subject to any disclaimer, the term of this patent is extended or adjusted under 35 U.S.C. 154(b) by 67 days.

(21) Appl. No.: 14/539,878

(22) Filed: Nov. 12, 2014

(65) Prior Publication Data
US 2015/0130117 A1 May 14, 2015

Related U.S. Application Data

(60) Provisional application No. 61/903,348, filed on Nov. 12, 2013.

(51) Int. Cl.

| | | |
|---|---|---|
| *B29C 41/02* | (2006.01) | |
| *B29C 41/22* | (2006.01) | |
| *B29C 41/52* | (2006.01) | |
| *B29C 69/00* | (2006.01) | |
| *B29C 70/68* | (2006.01) | |
| *B29C 70/70* | (2006.01) | |
| *B29C 67/00* | (2017.01) | |
| *B33Y 50/02* | (2015.01) | |
| *B33Y 10/00* | (2015.01) | |

(52) U.S. Cl.
CPC ...... *B29C 67/0088* (2013.01); *B29C 67/0055* (2013.01); *B29C 67/0059* (2013.01); *B29C 67/0081* (2013.01); *B29C 70/681* (2013.01); *B29C 70/682* (2013.01); *B33Y 10/00* (2014.12); *B33Y 50/02* (2014.12)

(58) Field of Classification Search
CPC ......... B29C 41/02; B29C 41/22; B29C 41/52; B29C 67/0051; B29C 67/0055; B29C 67/0059; B29C 67/0081; B29C 69/00; B29C 70/68; B29C 70/681; B29C 70/682; B29C 70/70
USPC ... 264/40.1, 129, 162, 259, 279, 279.1, 294, 264/308, 482, 492
See application file for complete search history.

(56) References Cited

U.S. PATENT DOCUMENTS

| | | | | |
|---|---|---|---|---|
| 6,630,093 B1 * | 10/2003 | Jones | .................... | B29C 70/088 264/162 X |
| 2006/0156978 A1 * | 7/2006 | Lipson | ................ | B29C 67/0055 118/708 |
| 2012/0304449 A1 * | 12/2012 | Jackson | .............. | B29C 67/0059 264/401 |

(Continued)

*Primary Examiner* — Leo B Tentoni
(74) *Attorney, Agent, or Firm* — White-Welker & Welker, LLC; Matthew T. Welker, Esq.

(57) ABSTRACT

An apparatus and method for multi-stage printing teaches means for removing and replacing a printed component during the printing process and accurately placing the component in the printer for continuation of the printing process. This can be accomplished through the use of a scanner, probe machine, or scanning Additionally, the present invention teaches the use of heating means in combination with a 3D printer to overcome additional issues with multi-sage printing.

15 Claims, 3 Drawing Sheets

(56) References Cited

U.S. PATENT DOCUMENTS

| | | | |
|---|---|---|---|
| 2013/0186549 A1* | 7/2013 | Comb | B29C 65/02 |
| | | | 156/62.8 |
| 2015/0093588 A1* | 4/2015 | Sadusk | B29C 67/0051 |
| | | | 428/480 |
| 2015/0170007 A1* | 6/2015 | Cudak | B29C 67/0088 |
| | | | 358/1.15 |
| 2015/0250598 A1* | 9/2015 | Yakimicki | A61F 2/3859 |
| | | | 623/20.35 |

* cited by examiner

METHOD FOR ENABLING THE PARTIAL PRINTING OF A DEVICE

CROSS REFERENCE TO RELATED APPLICATIONS

This application claims priority from U.S. Provisional Patent Application Ser. No. 61/903,348, entitled "System and Method for Enabling the Partial Printing of a Device", filed on 12 Nov. 2013. The benefit under 35 USC §119e of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to rapid prototyping using 3D printers. More specifically, the present invention relates to rapid prototyping using 3D printers where printing must be temporarily interrupted and the part removed from the printing area.

BACKGROUND OF THE INVENTION 3D printing is making great strides and is evolving into the manufacturing of multi-component devices. In order to manufacture such devices, it is required that printing be halted for a period of time, for various reasons. When printing is halted and a printed part is removed for additional work, the process results in many undesirable effects.

For example, when printing is halted, the temperature of the printed component begins to cool which can result in deformation. Additionally, if the printed component is removed from the print surface or the printing board is removed from the machine, it is currently impossible to accurately place the part back into the machine in order to continue the printing process on the part.

SUMMARY OF THE INVENTION

The proposed apparatus and method for multi-stage printing teaches means for removing and replacing a printed component during the printing process and accurately placing the component in the printer for continuation of the printing process. This can be accomplished through the use of a scanner, probe machine, or scanning Additionally, the present invention teaches the use of heating means in combination with a 3D printer to overcome additional issues with multi-stage printing.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
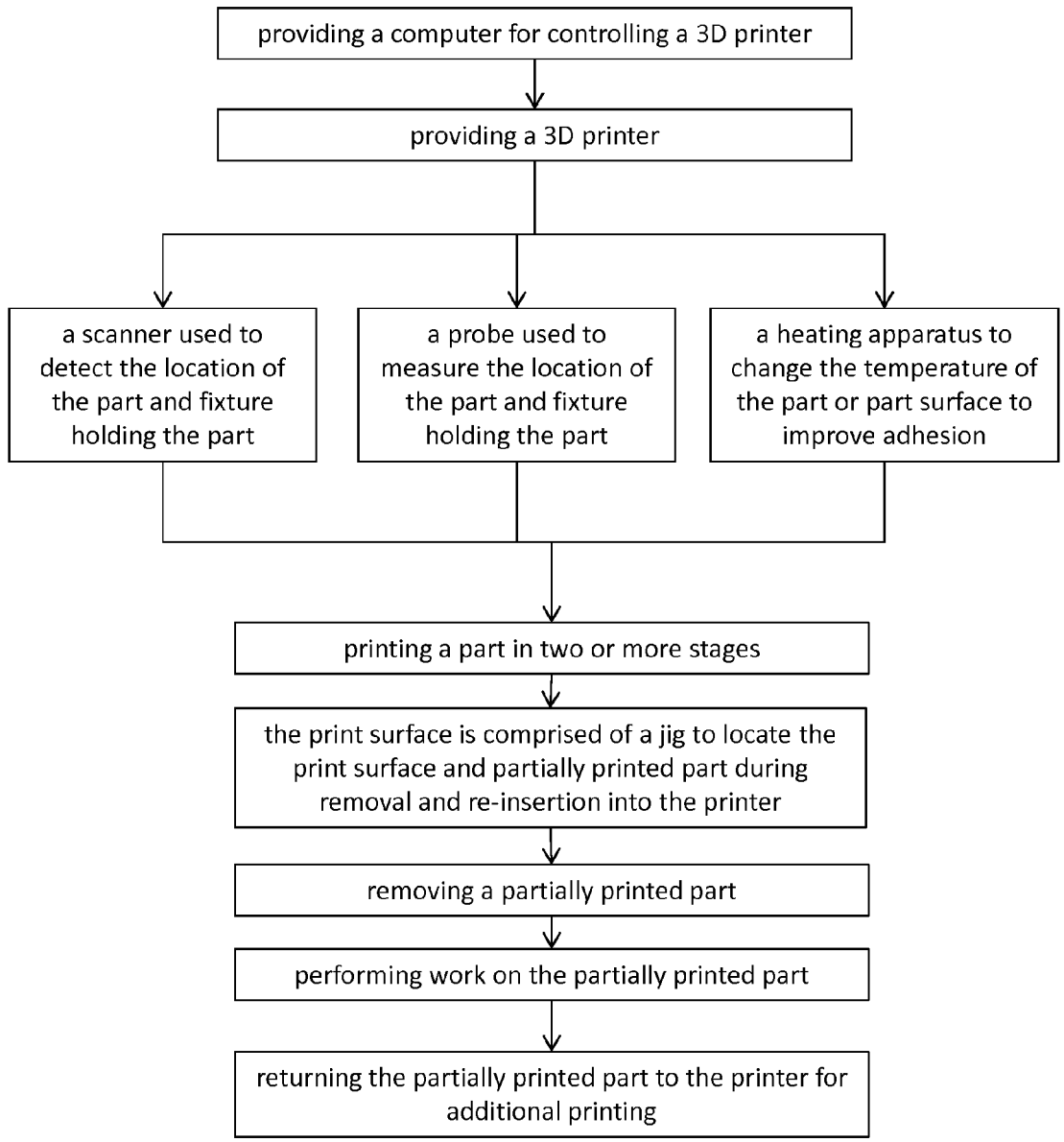
FIGS. 1-3 are flow charts illustrating the method of the present invention.
Figure 2:
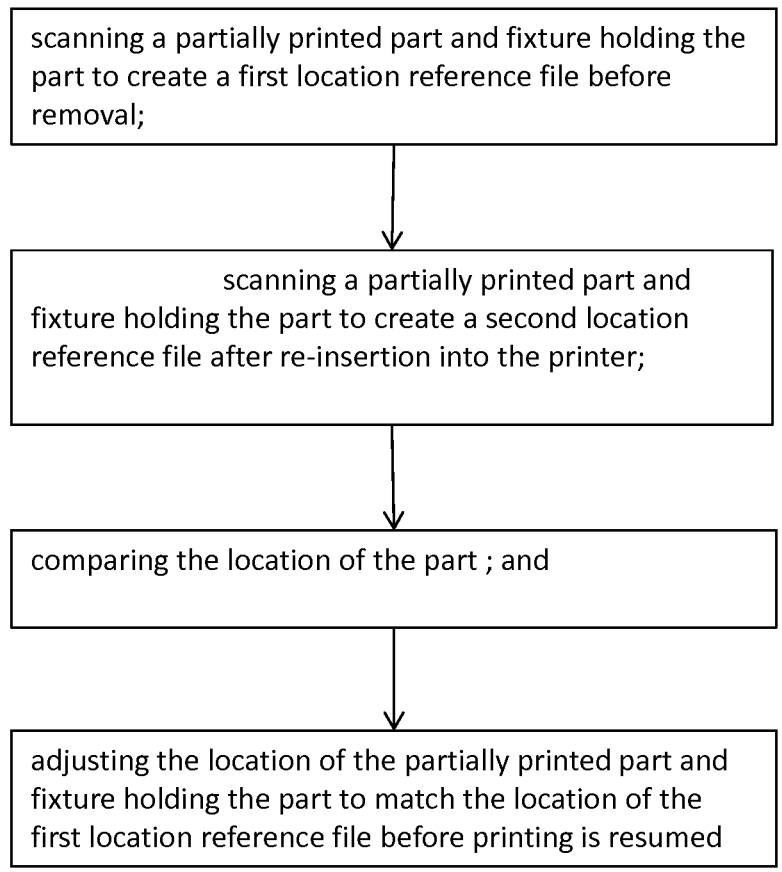
Figure 3:
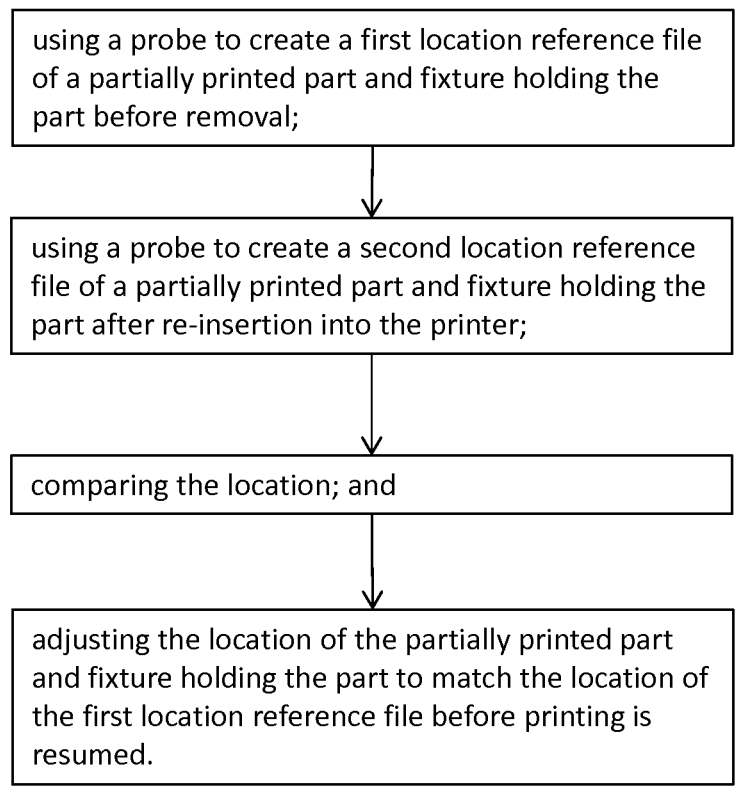

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Rapid prototyping or 3D printing has been a dream of engineers and architectures for centuries. In the past decade, rapid prototyping machines have evolved some significant characteristics that can make them useful for this problem.

As expected, field repair of these systems will become trivial by reprinting parts that have been broken, lost, or worn out. Standard parts like motors can be reused, and plastic can be recycled, further minimizing the operational footprint. These parts can be printed by untrained personal. Parts that would be hard or impossible to machine can easily be generated in minutes.

A new problem has now arisen where more complex parts are desired to be created by 3D printing. These parts are those that require that a part of component be printed in stages. Examples include any part with a cavity that is used to retain a different part, such as a motor housing, where the printing of the motor house must be stopped so that the motor can be placed within the cavity and printing re-started.

Printing in stages is very problematic as the temperature of the previously partially printed component changes and it is difficult to obtain adherence to the previously printed part when printing is resumed. Additionally, it is currently impossible to remove a partially printed object and return it to the printer in its exact location so the print process can be continued and the continued printing section will properly match up with the previous printed sections.

To solve this problem, the present invention proposes the combination of a 3D printer with either a scanner, measuring probe, or other repeatable jig or fixture for enabling a user to remove a partially printed part from a 3D printer and returning it to the exact position so that printing can be resumed.

In an embodiment with a scanner, a scanner would be used in combination with a 3D printer to scan the location of the part before removal and to re-scan the part after remove and replacement to ensure the location of the partially printed part before printing is resumed. The part could be removed for any number of reasons including adding metal, filling a cavity with other material or components, or stopping or pausing to correct malfunctions.

Currently, most 3D printer use a tray for loading and unloading an part. The trays, which may or may not lock into position are not calibrated to any type of accuracy, and even if the tray were in a repeatable location, the partially printed part could shift on the tray resulting in misalignment. A scanning device comparing a previous location to a current location and providing feedback for adjust or re-positioning would remove this possibility and enable partial or stage printing.

In another embodiment a probe could be used in combination with a 3D printer to provide location measurements of a partially printed device or to provide measurements for quality control purposes of a printed device.

In still another embodiment, a motorized plate, tray, or printing surface could be combined with the scanner or probe to automatically rotate the partially printed part and its associated plate into the proper position to ensure it precisely matches the previous location.

In yet another embodiment, a repeatable fixture would be used to ensure exact placement of a tray or plate which retains a partially printed part. Although this would be the least precise of the three embodiments.

Another problem with partial printing arises with adhesion between the partially printed stages of a model. When printing is started and stopped for any reason, the printed part begins to cool unless it is in a climate controlled printing environment. When the part begins to cool, the adhesive of subsequent printed sections is diminished and can compromise the integrity of the final printed part. Additionally if parts of the part cool at different rates, the part may end up deforming or with a partial deformation with can also compromise the integrity of the final printed part or render it useless.

To avoid these problems with stage printing, the 3D printer can be equipped with infrared heating lamps or other directed heat sources such as lasers or XY projectors to ensure the entire printed segment or areas where adhesion must be improved due to temperature loss can be spot heated to ensure integrity of the final and complete printed part.

By using spot heating, the chamber used by some 3D printers can be eliminated resulting in a larger work area and the ability to print larger models.

Additionally, the heating elements can be adjust to provide flash heating of key spots on a previously printed stage of the part to ensure adhesion when new sections are printed in subsequent stages. Spot heating of certain parts reduces the probability of warping or deformation of the entire printed parts, resulting in more accurate printing of large parts of parts requiring multi-stage printing.

In another embodiment, the partially printed part may be scanned and then either coated, having something inserted into an open cavity, or have a surface milled to provide a smooth surface for further printing. It is not uncommon for a partially printed part to cool and change dimension, typically shrinking in size. As a partially printed parts cools, the surface will also not be uniform due to different rates of cooling and different properties of the materials used.

Different materials shrink differently depending on their composition and physical properties. If a printer uses the same tool path, it would results in a seam, and most likely any new printing will be bigger than the previously printed part sections, which is likely to shrink. A 3D printer prints layer by layer. If a layer is not flat, the printer will miss and print into/on the air. The printer may have to fill in areas to bring the surface back to an even height.

When uneven surfaces occur during a printing comprising two or more steps, the partially printed part can be milled to ensure the surfaces are flat and then re-scanned to check dimensions and resume printing, or the computer and 3D printer can use a warp tool path to adjust and account for either calculated, known, or measured shrinkage/warping of the part and to compensate for this change when printing is resumed.

A 3D printer could also restart the printing algorithm with knowledge of what the starting surface looks like. With a partially printed part, the printer may have to even out valleys and peaks to even out the surface so that it can resume printing with a flat surface. This can be accomplished by completely re-doing the printing path, milling, or taking corrective printing action.

In yet another embodiment, a when a part is inserted into a partially printed part, a 3D printer can create a bridge or brace to adhere to the inserted part or fill any cavities with a foam or other material.

The system is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A method for multi-stage 3D printing, comprising
providing a computer for controlling a 3D printer;
providing a 3D printer;
providing a jig on the print surface of the 3D printer to locate the print surface and partially printed part during removal and re-insertion into the printer;
printing a part in two or more stages;
removing a partially printed part;
performing work on the partially printed part; and returning the partially printed part to the printer for additional printing.

2. The method of claim 1, wherein the partially printed part contains a cavity for retaining an additional device and the additional device is inserted as the work performed on the partially printed part before it is returned to the print area for additional printing.

3. The method of claim 1, comprising a 3D printer in combination with a scanner used to detect the location of the part and fixture holding the part.

4. The method of claim 3, further comprising the steps of
scanning a partially printed part and fixture holding the part to create a first location reference file before removal;
scanning a partially printed part and fixture holding the part to create a second location reference file after re-insertion into the printer;
comparing the location of the part; and
adjusting the location of the partially printed part and fixture holding the part to match the location of the first location reference file before printing is resumed.

5. The method of claim 1, comprising a 3D printer in combination with a probe used to measure the location of the part and fixture holding the part.

6. The method of claim 5, further comprising the steps of
using a probe to create a first location reference file of a partially printed part and fixture holding the part before removal;
using a probe to create a second location reference file of a partially printed part and fixture holding the part after re-insertion into the printer;
comparing the location; and
adjusting the location of the partially printed part and fixture holding the part to match the location of the first location reference file before printing is resumed.

7. The method of claim 1, further comprising a 3D printer in combination with a heating apparatus to change the temperature of the part or part surface to improve adhesion.

8. The method of claim 7, where the heating apparatus is a laser, infrared beam, or xy projector.

9. The method of claim 7, wherein the heating apparatus is used to heat a section of a partially printed part before resuming printing.

10. The method of claim 1, further comprising the steps of:
printing;
scanning;
milling to improve the surface finish;
inserting; and
continuing printing.

11. The method of claim 1, further comprising the step of:
printing a coat, scanning; and
continuing printing.

12. The method of claim 1, further comprising the steps of:
printing;
scanning;
doing one or more of the following actions: coating, inserting, and milling the partially printed part;
scanning;
using a warp tool path to adjust for shrinkage/warping; and
continuing printing.

13. The method of claim 12, further comprising the steps of:
adding a tool path to account for shrinkage.

14. The method of claim 12, further comprising the steps of:
creating a bridge or brace to adhere to the inserted part.

15. The method of claim 1, further comprising the step of:
inserting hardening foam.

\* \* \* \* \*